United States Patent [19]

Ohtsu et al.

[11] Patent Number: 4,550,007

[45] Date of Patent: Oct. 29, 1985

[54] PROCESS FOR PRODUCTION OF A PLASTIC BOTTLE

[75] Inventors: Yoichi Ohtsu; Kohei Kanno, both of Hiratsuka; Hiroshi Nagano, Tokyo, all of Japan

[73] Assignee: Mitsubishi Plastics Industries Limited, Tokyo, Japan

[21] Appl. No.: 592,273

[22] Filed: Mar. 22, 1984

Related U.S. Application Data

[62] Division of Ser. No. 437,485, Oct. 28, 1982, abandoned.

[30] Foreign Application Priority Data

Nov. 10, 1981 [JP] Japan ................... 56-180244

[51] Int. Cl.⁴ ............................................. B29C 17/07
[52] U.S. Cl. .................................... 264/521; 264/530; 264/532
[58] Field of Search ........................ 264/521, 530, 532

[56] References Cited

U.S. PATENT DOCUMENTS

| 4,108,937 | 8/1978 | Martineu et al. ........... 264/274 X |
| 4,115,494 | 9/1978 | Valyi .............................. 264/513 |
| 4,235,837 | 11/1980 | Noonan ...................... 264/521 X |

FOREIGN PATENT DOCUMENTS

| 2400951 | 7/1975 | Fed. Rep. of Germany ...... 264/530 |
| 54-22466 | 2/1979 | Japan ............................... 264/532 |

Primary Examiner—Jan Silbaugh
Attorney, Agent, or Firm—Oblon, Fisher, Spivak, McClelland & Maier

[57] ABSTRACT

A plastic bottle made of biaxially oriented polyethylene terephthalate comprises a narrow neck portion, a downwardly and outwardly flared shoulder portion continuous from the neck portion, a generally cylindrical body portion and a bottom portion, wherein said portions except for the neck portion have a density of at least 1.375, and the internal volume increase rate is less than 5% when the bottle filled with a liquid at 20° C. containing a 2 gas volume of carbon dioxide gas is immersed in warm water at 75° C. for 30 minutes.

11 Claims, 4 Drawing Figures

PROCESS FOR PRODUCTION OF A PLASTIC BOTTLE

This application is a divisional application of U.S. Ser. No. 437,485, by the same inventors, entitled "Plastic Bottle and Process for its Production", filed Oct. 28, 1982, and now abandoned.

BACKGROUND OF THE INVENTION

1. Field of the Invention

The present invention relates to a plastic bottle having good heat resistance, pressure resistance and mechanical strength, and a process for its production.

2. Description of the Prior Art

Polyester bottles have widely been used as bottles for foods and beverages such as soy sauce or other sauces, as they have high mechanical strength and are chemically stable.

Particularly, bottles made of polyethylene terephthalate have become popular in recent years as bottles for carbonated beverages, as they have a low permeability against gas such as oxygen or carbon dioxide and good transparency.

In a conventional process for the production of polyethylene terephthalate bottles, it is common that bottles obtained by blow stretching are subjected to heat treatment to improve the heat resistance and to prevent the thermal shrinkage. However, merely by such heat treatment, it has been impossible to obtain a plastic bottle having adequate heat resistance, pressure resistance and mechanical strength required for a bottle for carbonated beverages.

For a bottle to be used as a bottle for a carbonated beverage, it is common that the bottle is first filled with a carbonated beverage and sealed and then a shower of hot water at a temperature of about 70° to 80° C. is sprayed on the bottle for about 30 minutes for sterilization. However, in the case of polyethylene terephthalate bottles produced by the conventional processes, when the internal pressure of the bottles is raised by a volume expansion of the carbonated beverage filled in the bottles or by the gasification of the carbonated substance in the beverage, the entire bottles are likely to undergo an expansion or the bottoms thereof are likely to bulge and deform in to a semispherical shape, whereby their outer appearances tend to be extremely impaired to such an extent that they are no longer acceptable for practical purpose.

SUMMARY OF THE INVENTION

As a result of research conducted to overcome the difficulties inherent to the conventional polyethylene terephthalate bottles, the present inventors have found that in forming a bottle by blow stretching a parison, (1) if the stretching rate is increased while maintaining the stretched wall thickness to be substantially uniform, it is possible to facilitate the crystallization without leading to whitening during the subsequent heat treatment and thereby to remarkably improve the heat resistance and pressure resistance, and (2) the mechanical strength can be improved by restretching the intermediate product obtained by the first blow stretching and subjected to natural shrinkage.

DESCRIPTION OF THE INVENTION

The present invention provides a plastic bottle made of biaxially oriented polyethylene terephthalate which comprises a narrow neck portion, a downwardly and outwardly flared shoulder portion continuous from the neck portion, a generally cylindrical body portion and a bottom portion, in which said portions except for the neck portion have a density of at least 1.375, and the internal volume increase rate is less than 5% when the bottle filled with a liquid at 20° C. containing a 2 gas volume of carbon dioxide gas is immersed in warm water at 75° C. for 30 minutes. It is preferred that the bottom portion has a semi-spherically protruded configuration.

The present invention also provides a process for producing a plastic bottle which comprises blow stretching a parison of polyethylene terephthalate in a first mold to form an intermediate product, transferring the intermediate product to a second mold while the intermediate product which has undergone shrinkage is still soft and restretching the intermediate product in the second mold and which process is characterized by the following steps:

(A) a step of adjusting the portions of the parison corresponding to the shoulder and bottom portions of the bottle to a stretching temperature higher by from 2° to 5° C. than the temperature of the portion corresponding to the body portion of the bottle at the time of heating and stretching the parison;

(B) a step of forming the intermediate product by blow stretching the parison from 10 to 14 times as a product of the stretching rates in axial and radial directions in the first mold heated to a temperature of at least the crystallizing temperature of the parison and at least 20° C. below the melting point of the parison and subjecting the intermediate product to heat treatment by maintaining it in intimate contact with the inner wall of the first mold for a predetermined period of time;

(C) a step of transferring the intermediate product to a second mold having an internal volume of from 75 to 115% relative to the internal volume of the first mold, and restretching it in the second mold.

Now, the present invention will be described in detail with reference to the enclosed drawings.

DESCRIPTION OF THE DRAWINGS

In the accompanying drawings.

DESCRIPTION OF THE PREFERRED EMBODIMENTS

Figure 1:
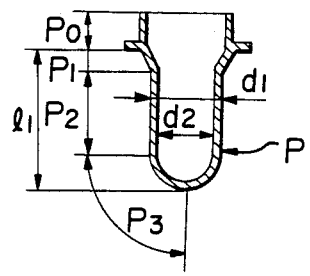
FIG. 1 is a vertical cross section of the parison.

The polyethylene terephthalate used as the material for the bottles of the present invention is obtainable by polymerizing terephthalic acid or its ester-forming derivative with ethylene glycol. It may contain a small amount of other dicarboxylic acid or diol as a copolymerized component. For the purpose of the present invention, such polyethylene terephthalate should preferably have an intrinsic viscosity of at least 0.65. If the intrinsic viscosity is less than 0.65, the impact strength tends to be poor, such being undersirable.

As the above mentioned dicarboxylic acid, there may be mentioned aromatic dicarboxylic acids such as phthalic acid, isophthalic acid or naphthalene dicarboxylic acids, or aliphatic dicarboxylic acids such as adipic acid or azelaic acid. As the diol component, there may be mentioned aliphatic diols such as trimethylene glycol or propylene glycol, or alicyclic glycols, or aromatic diols such as bisphenol or hydroquinone.

In the present invention, a bottomed parison made of the polyethylene terephthalate is used. This parison may be obtained by injection molding or by cutting a tubular product formed by extrusion molding into a proper length, followed by providing a bottom to it.

In either method, the parison is preferably formed in a generally cylindrical shape or in a tapered configuration with a wall thickness substantially uniform over the entire structure. However, the wall thickness may be varied depending upon the configuration of the bottle to be formed, so that the wall thickness is made somewhat greater at the portions to be stretched at a higher stretching rate.

According to the present invention, this parison is first set in a first mold and subjected to blow stretching to form an intermediate product and to apply heat treatment to the intermediate product.

In this operation, the parison is heated in a heating furnace to an optimum temperature for stretching to provide a partial temperature gradient. The optimum stretching temperature may vary to some extent depending upon the particular polyethylene terephthalate material, but it is generally preferred that the temperature be higher by from 20° to 30° C. than the glass transition temperature (Tg). The heating step to provide a temperature gradient to the parison is usually carried out by firstly heating the parison to a uniform optimum stretching temperature and then partially heating the portions of the parison corresponding to the shoulder and bottom portions of the bottle where stretching is relatively difficult, to a temperature higher by from 2° to 5° C. than the portion corresponding to the body portion of the bottle where stretching can relatively easily be done. Otherwise, it is possible to impart the temperature gradient to the parison in a single step by introducing the parison into a heating furnace having partially different temperature conditions.

If the temperature gradient is less than 2° C., the stretching of the portions corresponding to the shoulder and bottom portions of the bottle will be inadequate and uniform stretching can hardly be done. On the other hand, if the temperature gradient exceeds 5° C., the stretching at these portions will proceed more greatly than the other portion and it will be difficult to obtain a bottle having a uniform wall thickness over the entire structure. Therefore, the temperature gradient may optionally be adjusted within a range of from 2° to 5° C. depending upon the particular configuration of the bottle.

The first mold is preliminarily heated to bring the inner wall surface to a temperature of at least the crystallizing temperature of the parison and at least 20° C. below the melting point of the parison by means of a heating medium circulated in the wall of the mold or by means of an electric heater surrounding the outer surface of the first mold. After placing the parison in the first mold, a pressurized fluid under pressure of from 8 to 30 kg/cm$^2$ is blown into the parison and the parison is thereby biaxially stretched. In this stretching step, it is also possible to use a stretching rod. In this case, the stretching rod is protruded into the parison and the blow stretching is carried out in such a manner that the parison is stretched in the axial direction and subsequently or simultaneously with this axial stretching, a pressurized fluid is blown into the parison to radially expand the parison.

The intermediate product obtained by the first blow stretching has a configuration comprising a narrow neck portion, a shoulder portion downwardly and outwardly flared and being continuous from the neck portion, a generally cylindrical body portion and a bottom portion which is preferably formed in a semispherically bulged configuration. The stretching rate (i.e. the axial stretching rate x the radial stretching rate) is from 10 to 14 times. In this case, it is preferred that the axial stretching rate is from 2 to 3.5 times and the radial stretching rate is from 3 to 5 times. If the stretching rate is less than 10 times, the stretching at the portions corresponding to the shoulder and bottom portions of the bottle will be inadequate and consequently there will be a difficulty such that these portions undergo deformation when the bottle is subjected to sterilization at a high temperature or filled with a high temperature substance. On the other hand, if this stretching rate exceeds 14 times, inner layer peeling is likely to occur at the body portion of the bottle where the stretching takes place most readily, whereby the outer appearance will be impaired to a great extent.

The intermediate product thus formed is subject to heat treatment by maintaining it in contact with the inner surface of the first mold for a predetermined period of time. This operation is preferably conducted by applying an internal pressure of from 8 to 30 kg/cm$^2$ to the intermediate product to press the outer surface of the intermediate product against the inner surface of the mold. The period of time for maintaining the intermediate product in contact with the inner surface of the mold in this heat treatment is determined based on the wall thickness of the intermediate product and the temperature of the inner surface of the mold. In general, the period is shorter when the temperature of the inner surface of the mold is higher and the period is longer when the temperature of the inner surface is lower. More specifically, sufficient heat treatment can be done by maintaining the intermediate product in contact with the inner surface of the mold for from 2 to 10 second at an inner surface temperature of about 140° C., from 1.5 to 8 seconds at an inner surface temperature of about 170° C., or from 1 to 6 seconds at an inner surface temperature of about 200° C.

If the temperature of the inner surface of the mold is lower than the crystallizing temperature, a longer period is required for the heat treatment and yet no adequate heat treatment can be done. Further, if the temperature is higher than 20° C. below the melting temperature, the outer surface of the intermediate product is likely to adhere to the inner surface of the mold, such being undersirable. Thus, the first mold is heated to a temperature of at least the crystallizing temperature of the parison and at least 20° C. below the melting point of the parison.

The crystallizing temperature here is about 120° C. and the melting point here is about 260° C., but as measured by differential thermal analysis.

According to the present invention, the intermediate product thus obtained is further restretched in the second mold to form a plastic bottle.

In this restretching step, a second mold having an internal volume of from 75 to 115% relative to the internal volume of the first mold is used. If the internal volume is less than 75%, it tends to be smaller than the size of the shrunk intermediate product, whereby the restretching in the second mold becomes difficult and it becomes likely that wrinkles are formed, or pinching or gripping occurs. On the other hand, if the internal volume exceeds 115%, necking, rupture, etc. are likely to take place during the restretching operation of the intermediate product in the second mold.

This second mold preferably has a similar configuration to the first mold. However, it may have a slightly different configuration depending upon the desired configuration of the bottle to be obtained. For instance, if it is desired to provide a ring-shaped convex or concave around the body portion of the plastic bottle as the final product, the corresponding concave or convex is provided on the inner surface of the second mold without providing such concave or convex on the inner surface of the first mold, so that the desired concave or convex is formed on the body portion when the intermediate product is restretched in the second mold. This is preferred because the intermediate product withdrawn from the first mold undergoes natural shrinkage and this shrinkage tends to be irregular due to the difference in the stretching rate, and if the concave or convex is provided on the body portion of the intermediate product, it tends to be difficult to bring the concave or convex in alignment with the convex or concave provided on the inner surface of the second mold.

The restretching in the second mold is effective in adjusting the configuration of the intermediate product to the final form of the plastic bottle to be obtained. However, this effectiveness is secondary in nature for the purpose of the present invention. The more important object of the restretching according to the present invention is to improve the mechanical strength of the final product by transferring the intermediate product obtained by the stretching and heat treatment in the first mold to the second mold and restretching the intermediate product by blowing a pressurized fluid into the intermediate product in the second mold.

The intermediate product withdrawn from the first mold is in a softened state and undergoes natural shrinkage as the strain created by stress during the first stretching diminishes. The intermediate product thus shrunk and being in a softened state is swiftly transferred to the second mold (it is preferred to complete this transfer from the first mold to the second mold within 10 seconds, and more preferably, the period of time from the opening of the first mold to the closing of the second mold should be from 2.5 to 10 seconds), and the restretching is carried out by blowing a pressurized fluid under pressure of from 8 to 30 kg/cm² into the intermediate product. If the second mold is cooled at a temperature of not higher than the glass transition temperature (Tg) of the parison, the plastic bottle can immediately be withdrawn after the restretching, whereby it is possible to smoothly carry out the continuous molding of the plastic bottles.

The plastic bottle thus obtained had a configuration comprising a narrow neck portion, a shoulder portion downwardly and outwardly flared and being continuous from the neck portion, a generally cylindrical body portion and a bottom portion, in which all portions except for the neck portion had a substantially uniform thickness and were biaxially oriented with the density being at least 1.375. This plastic bottle was filled with a carbonated beverage and sealed, and then a hot water shower was sprayed thereon in accordance with the conventional high temperature sterilization method, whereby no deformation of the shoulder or bottom portion of the bottle was observed. No deformation of the entire bottle structure due to the increase of the inner pressure by the high temperature sterilization was observed, and the permeation of the internal gas was minimum. Thus, the plastic bottle was found to be extremely useful as a bottle for a carbonated beverage.

Now, the invention will be described in detail with reference to Examples which should not be considered limiting.

EXAMPLES

The conditions for the measurement of the major properties were as follows:

Intrinsic viscosity ($\eta$): The intrinsic viscosity was measured at the polymer concentration of 1% in a solution of 30° C. composed of tetrachloroethane and phenol in a weight ratio of 1:1.

Density: The density was measured by a density gradient method. As the liquid having a density gradient, a mixture of normal heptane and carbon tetrachloride was used.

Volume increase rate:

$$\left( \frac{\text{Internal volume of the bottle after the test}}{\text{Internal volume of the bottle before the test}} - 1 \right) \times 100(\%)$$

A liquid of 20° C. containing 2 gas volume of carbon dioxide was filled in the bottle leaving a head space corresponding to 3% of the internal volume of the bottle. The "2 gas volume of carbon dioxide" means that the volume of carbon dioxide at 20° C. under 1 atm. is twice the volume of the liquid. The bottle was sealed and immersed in warm water of 75° C. for 30 minutes, whereupon the increase of the internal volume waa measured by percentage.

EXAMPLES 1 TO 6 AND COMPARATIVE EXAMPLES 1 TO 3

Polyethylene terephthalate having an intrinsic viscosity ($\eta$) of 0.72 was injection molded to obtain a bottomed parison having an average outer diameter ($d_1$) of 25.5 mm, an average inner diameter ($d_2$) of 17.5 mm, an effective stretchable length ($l_1$) except for the neck portion being 144.6 mm and a weight of 64 g. The vertical cross section of this parison is shown in FIG. 1.

This parison P is introduced into a heating furnace and the entire parison except for the neck portion (i.e. the portion not to be stretched) $P_0$, was heated to bring the portion $P_1$ corresponding to the shoulder portion of the bottle to a temperature of 96° C., the portion $P_2$ corresponding to the body portion of the bottle to a temperature of 94° C. and the portion $P_3$ corresponding to the bottom portion of the bottle to a temperature of 97° C.

Figure 2:
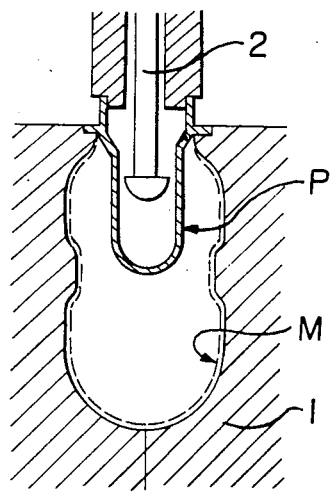
FIG. 2 is a vertical cross sectional view illustrating the step of placing the parison in the first mold and blow stretching it therein.

Then, this parison P was set in the first mold 1 as shown in FIG. 2, and pressurized air (room temperature) under pressure of 25 kg/cm² was blown into the parison P while axial stretching was being carried out by pushing an stretching rod 2, whereby an intermediate product M was formed. The intermediate product M was brought in contact with the inner surface of the mold and subjected to heat treatment for 4 seconds.

Figure 3:
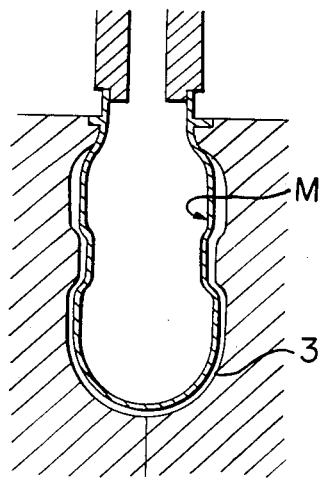
FIG. 3 is a vertical cross sectional view illustrating the step of restretching the intermediate product in the second mold.

Thereafter, the intermediate product M was taken out from the first mold 1 and transferred to a second mold 3 having an internal volume of 1,570 ml. Pressurized air (room temperature) under 25 kg/cm$^2$ was blown into the intermediate product M (see FIG. 3) for restretching.

Figure 4:
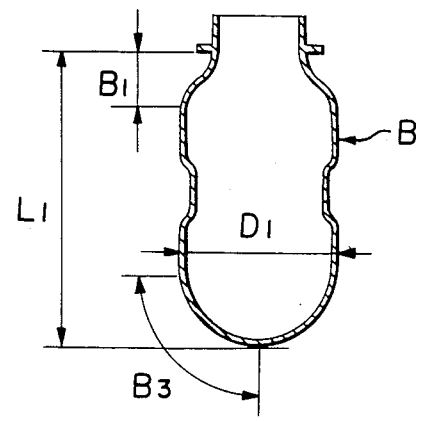
FIG. 4 is a vertical cross section of a plastic bottle thereby obtained.

As the result, a plastic bottle B having a configuration as shown in FIG. 4 and a stretching rate (i.e. the axial stretching rate × the radial stretching rate) of 10 times was obtained.

The internal volume of the first mold used in this molding operation was 1,649 ml in the cases of Comparative Examples 1 and 2, 1,727 ml in the cases of Examples 1 and 2, and 2,072 ml in the cases of Examples 3 to 6 and Comparative Example 3. The stretching rate of the intermediate product in the first mold and the ratio of the internal volume of the second mold to the internal volume of the first mold are as shown in Table 1. The density of the plastic bottle obtained by each of the Examples and Comparative Examples and the volume increase rate of the bottle are shown in Table 1.

The densities in Table 1 are the smallest ones among the densities of the average radial parts of the shoulder portion $B_1$ or of the average radial parts of the bottom portion $B_3$ of the plastic bottle shown in FIG. 4.

The stretching rate (i.e. the axial stretching rate × the radial stretching rate) was calculated by the following formula:

$$\text{Stretching rate: } \frac{L_1 + \frac{D_1}{2}}{l_1} \times \frac{D_1}{\frac{d_1 + d_2}{2}}$$

where $d_1$: Average outer diameter of the parison.
$d_2$: Average inner diameter of the parison.
$l_1$: Length of the effective stretchable portion of the parison except for the neck portion $P_0$.
$D_1$: Average outer diameter of the body portion of the plastic bottle.
$L_1$: Length of the plastic bottle except for the neck portion.

It is evident from Table 1 that the bottles obtained by Examples 1 to 6 according to the present invention have a density of 1.375 or greater at the shoulder, bottom and body portions thereof, and the volume increase rate were less than 5% in all cases. Whereas, in Comparative Examples 1 and 2, the densities of the shoulder portions and the bottom portions of the bottles were 1.370 or less and the volume increase rates were 6.5 or greater and were thus found to exceed the upper limit of 5% for the practical application for a pressure resistant bottles for beverages. In Comparative Example 3, the densities of the shoulder, bottom and body portions were at least 1.375 and nevertheless spherulite whitening was resulted at the shoulder and bottom portions of the bottle during the heat treatment because the inner surface temperature of the first mold was higher than 240° C., whereby the outer appearance was poor.

Table 1 shows the relation between the density of the plastic bottle and the volume increase rate in the case where the stretching rate of the plastic bottle in the second mold was fixed at 10 times while the internal volume ratio of the second mold relative to the first mold was varied to a level of 95%, 91%, or 76%.

Whereas Table 2 shows the evaluation of the plastic bottles in the case where the internal volume ratio was varied to a level of 128%, 111%, 95%, 91%, 76%, and 71% at each of the stretching rates of the plastic bottles in the second mold being 8 times, 9 times, 10 times, 13 times and 14 times.

In this case, the configuration and the size of the parison, the heating conditions and the process for the production of the bottles were the same as in the above Examples and Comparative Examples. In every case, the inner surface temperature of the first mold was at 170° C. and the heat treatment was conducted by bringing the intermediate product in contact with the inner surface of the mold for 4 seconds.

It is evident from Table 2 that when the internal volume ratio of the second mold relative to the first mold is 128%, a thickness variation resulted at the shoulder or bottom portions of the bottles or the necking or rupture occurred at the time of the restretching in the second mold, whereby it was not possible to obtain bottles which are practically useful. On the other hand, if the ratio of the internal volume was 71%, wrinkles were formed on the bottles, or pinching or gripping occurred at the time of the restretching in the second mold. Further, when the stretching rate in the first mold exceeded 16 times, it was difficult to carry out the blow streching of the parison.

Even when the internal volume ratio of the second mold relative to the first mold was from 111% to 76%, if the stretching rate of the intermediate product in the first mold was less than 10 times, it was likely that a thickness variation resulted at the shoulder or bottom portions of the bottle, or whitening was slightly observed. On the other hand, if the stretching rate exceeded 14 times, the inner layer peeling was distinctly observed in the intermediate product, and the bottle thereby obtained was inferior in its transparency and was not practically useful.

The bottles of the present invention fall within a range defined by a dotted line in Table 2. Namely, when the heat treatment was conducted at a stretching rate of the intermediate product in the first mold being from 10 to 14 times and the restretching was conducted at the internal volume ratio of the second mold relative to the first mold being from 75 to 115% plastic bottles having good transparency and extremely good outer appearance were obtained.

TABLE 1

| | Density ($\eta$) | Volume increase rate (%) | Stretching rate of the intermediate product | Internal volume ratio (%) | Inner surface temperature of the first mold (°C.) | Notes |
|---|---|---|---|---|---|---|
| Comparative Example 1 | 1.366 | 9.7 | 10.3 | 95 | 110 | Good outer appearance |
| Comparative Example 2 | 1.370 | 6.5 | 10.3 | 95 | 120 | Good outer appearance |
| Example 1 | 1.375 | 4.9 | 10.6 | 91 | 130 | Good outer appearance |
| Example 2 | 1.379 | 3.4 | 10.6 | 91 | 150 | Good outer appearance |

TABLE 1-continued

| | Density (η) | Volume increase rate (%) | Stretching rate of the intermediate product | Internal volume ratio (%) | Inner surface temperature of the first mold (°C.) | Notes |
|---|---|---|---|---|---|---|
| Example 3 | 1.384 | 2.6 | 12.0 | 76 | 170 | Good outer appearance |
| Example 4 | 1.388 | 1.8 | 12.0 | 76 | 190 | Good outer appearance |
| Example 5 | 1.391 | 1.7 | 12.0 | 76 | 210 | Good outer appearance |
| Example 6 | 1.394 | 1.5 | 12.0 | 76 | 230 | Good outer appearance |
| Comparative Example 3 | 1.395 | 1.3 | 12.0 | 76 | 245 | Whitening observed at the shoulder and bottom portions |

TABLE 2

| Stretching rate | Internal volume ratio (%) | | | | | |
|---|---|---|---|---|---|---|
| | 128 | 111 | 95 | 91 | 76 | 71 |
| 8 | (6.7) ΔX | (7.4) Δ | (8.3) ○ | (8.5) ○ | (9.9) □ | (10.0) □ |
| 9 | (7.6) ΔX | (8.4) Δ | (9.3) ○ | (9.6) ○ | (10.8) ◎ | (11.3) □ |
| 10 | (8.5) ΔX | (9.3) ○ | (10.3) ◎ | (10.6) ◎ | (12.0) ◎ | (12.5) □ |
| 13 | (11.0) X | (12.1) ◎ | (13.4) ◎ | (13.9) ◎ | (15.6) ● | (16.3) ■ |
| 14 | (11.8) X | (13.1) ◎ | (14.5) ● | (14.9) ● | (16.8) ■ | (17.5) ■ |

In Table 2, the values shown in brackets ( ) are the stretching rates of the intermediate products in the first mold.
○ : The shoulder or bottom portion of the bottle was slightly whitened.
Δ: The shoulder or bottom portion of the bottle had a non-uniform thickness
□: Formation of wrinkles, or partial pinching or gripping in the second mold
● : Inner layer peeling distinctly observed (in the first mold)
X: Necking, or rupture (in the second mold)
■ : Hardly stretchable (in the first mold)
◎ : Extremely good outer appearance

We claim:

1. A process for producing a plastic bottle wherein all portions except for the neck have substantially uniform thickness, a density of at least 1.379, and the internal volume increase rate is less than 3.4% when the bottle filled with a liquid at 20° C. containing a two gas volume of $CO_2$ is immersed in 75° C. water for 30 minutes, which comprises blow stretching a parison of polyethylene terephthalate in a first mold to form an intermediate product, transferring the intermediate product to a second mold while the intermediate product which has undergone shrinkage is still soft, and restretching the intermediate product in the second mold and which process is characterized by the following steps:

(A) heating the parison to a temperature 20°-30° C. higher than the glass transition temperature;
   (B) simultaneously or subsequently to step (A) adjusting the portions of the parison corresponding to the shoulder and bottom portions of the bottle to a stretching temperature higher by from 2° to 5° C. than the temperature of the portion corresponding to the body portion of the bottle at the time of heating the parison in step (A);
   (C) forming the intermediate product by blow stretching the temperature adjusted parison from 10 to 14 times as a product of the stretching rates in axial and radial directions in the first mold heated to a temperature of at least 150° C. and at least 20° C. below the melting point of the parison and subjecting the intermediate product to heat treatment by maintaining it in intimate contact with the inner wall of the first mold for a predetermined period of time;
   (D) transferring the intermediate product to a second mold having an internal volume of from 75 to 95% relative to the internal volume of the first mold, and
   (E) restretching it in the second mold to obtain the bottle.

2. The process according to claim 1 wherein the blow stretching in the first mold is carried out by blowing a pressurized fluid under pressure of from 8 to 30 kg/cm² into the parison.

3. The process according to claim 2 wherein a stretching rod is used for axially stretching the parison.

4. The process according to claim 1 wherein the parison is stretched from 2 to 3.5 times in the axial direction and from 3 to 5 times in the radial direction.

5. The process according to claim 1 wherein the first mold is heated to a temperature of from about 150° C. to about 240° C.

6. The process according to claim 1 wherein the heat treatment of the intermediate product is carried out by maintaining the intermediate product in contact with the inner wall of the first mold at a temperature of from 150° to 200° C. for from 1 to 10 seconds.

7. The process according to claim 1 wherein the transfer of the intermediate product from the first mold to the second mold is completed within 10 seconds.

8. The process according to claim 1 wherein the restretching in the second mold is carried out by blowing a pressurized fluid under pressure of from 8 to 30 kg/cm² into the intermediate product.

9. The process according to claim 1 wherein the second mold is at a temperature of not higher than the glass transition temperature of the parison.

10. The process of claim 1 wherein steps (A) and (B) are carried out simultaneously. CM 11. The process of claim 1 wherein step (A) is carried out prior to step (B).

11. The process of claim 1 wherein step (A) is carried out prior to step (B).

* * * * *